(12) United States Patent
Zheng

(10) Patent No.: US 10,247,288 B2
(45) Date of Patent: *Apr. 2, 2019

(54) CIRCULAR WAVE DRIVE

(71) Applicant: OHIO STATE INNOVATION FOUNDATION, Columbus, OH (US)

(72) Inventor: Yuan F. Zheng, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,339

(22) Filed: Nov. 14, 2016

(65) Prior Publication Data

US 2017/0059025 A1    Mar. 2, 2017

Related U.S. Application Data

(63) Continuation of application No. 14/726,452, filed on May 29, 2015, now Pat. No. 9,494,224, which is a continuation-in-part of application No. 14/291,960, filed on May 30, 2014, now Pat. No. 9,677,657.

(51) Int. Cl.
*F16H 49/00* (2006.01)
(52) U.S. Cl.
CPC ..... *F16H 49/001* (2013.01); *F16H 2049/006* (2013.01); *Y10T 74/19* (2015.01)

(58) Field of Classification Search
CPC ............... F16H 49/001; F16H 2049/006
See application file for complete search history.

(56) References Cited

U.S. PATENT DOCUMENTS

| | | | | |
|---|---|---|---|---|
| 3,211,400 | A * | 10/1965 | Booth | B64C 25/50 244/50 |
| 3,214,999 | A * | 11/1965 | Lapp | F16H 49/001 74/640 |
| 6,664,711 | B2 * | 12/2003 | Baudendistel | H02K 41/06 310/323.02 |
| 7,552,664 | B2 * | 6/2009 | Bulatowicz | F16H 49/001 74/640 |
| 9,808,357 | B2 * | 11/2017 | Langlois | A61F 2/60 |

\* cited by examiner

*Primary Examiner* — David J Hlavka
(74) *Attorney, Agent, or Firm* — Benesch, Friedlander, Coplan & Aronoff LLP

(57) ABSTRACT

A circular wave drive system, and a method for use of a circular wave drive, are provided. In one embodiment, a circular wave drive is provided, the circular wave drive comprising: a substantially enclosed housing having a chamber therein, a ring-shaped wheel residing in the chamber, a wave generator having a wheel-driving portion that is oriented within the hollow central portion of the ring-shaped wheel; and an output element having a wheel-driven portion that is oriented within the hollow central portion of the ring-shaped wheel opposite the wheel-driving portion of the wave generator.

20 Claims, 14 Drawing Sheets

900

Selecting a desired reduction ratio for the circular wave drive — 910

Providing a circular wave drive including: a wheel oriented within a housing, a wave generator oriented within the wheel in a first axial portion of the wheel, an output element oriented within the wheel in a second axial portion of the wheel, wherein the housing includes an inner wall having an inner radius R1, and wherein the output element includes an outer radius R3, wherein the circular wave drive includes friction elements not comprising gear teeth, and wherein no slippage exists between the wheel and the housing — 920

Calculating a reduction ratio using the equation: Reduction Ratio = (R1 − R3) / R3 — 930

CIRCULAR WAVE DRIVE

CROSS-REFERENCE TO RELATED APPLICATIONS

This application is a continuation of a U.S. patent application Ser. No. 14/726,452, filed May 29, 2015, which issued as U.S. Pat. No. 9,494,224, which is a continuation-in-part of U.S. patent application Ser. No. 14/291,960, filed on May 30, 2014, which is incorporated by reference herein in its entirety.

BACKGROUND

A number of devices for transmitting power and reducing motor output speed are currently known. Two such devices are the harmonic drive and the cycloidal drive.

The more well-known of these devices is the harmonic drive, having been introduced in the 1950's and currently being in wide-spread use. However, the harmonic drive requires the use of a flexspine, which is deliberately deformed repeatedly during operation of the harmonic drive. This deformation of the flexspine fatigues the material from which the flexspine is constructed, which fatigue limits the speed reduction and torque transfer that may be achieved with a harmonic drive.

Typical versions of the cycloidal drive are of relatively complex construction and operation. The cycloidal drive requires many moving parts, each of which may be a point of failure. In addition to being of complex design, cycloidal drives are typically not backdrivable. The eccentric rotation of the cycloidal disc also produces an undesirable vibration that may be transmitted through the input and output shafts if not compensated for. Finally, contact between the output rollers and the receiving holes in the cycloidal disc may also lead to the wear of both components.

What is needed is a power transmission/speed reduction device that does not suffer from the described drawbacks of known harmonic and cycloidal drives. Such a device may also offer a more simplistic construction, as well as a long life.

SUMMARY

In one embodiment, a circular wave drive is provided, the circular wave drive comprising: a substantially enclosed housing having a chamber therein, wherein the periphery of the chamber is defined by a circular wall, wherein the circular wall includes an inner diameter, and wherein the circular wall includes a friction element; a ring-shaped wheel residing in the chamber, wherein the ring-shaped wheel includes both an external friction element and an internal friction element, wherein the ring-shaped wheel includes a hollow central portion including an inner wall having an inner diameter, the inner wall including the internal friction element, wherein the ring-shaped wheel includes an outer diameter, and wherein the ring-shaped wheel outer diameter is less than the inner diameter of the circular wall; a wave generator having a wheel-driving portion that is oriented within the hollow central portion of the ring-shaped wheel, wherein the wave generator includes an eccentrically mounted input shaft extending from the wheel-driving portion and through the housing; and an output element having a wheel-driven portion that is oriented within the hollow central portion of the ring-shaped wheel opposite the wheel-driving portion of the wave generator, wherein the output element includes an output shaft that extends from the wheel-driven portion and through the housing in an opposite direction of the input shaft of the wave generator, and wherein a peripheral face of the wheel-driven portion includes a friction element being in contact with the internal friction element of the ring-shaped wheel.

In another embodiment, a circular wave drive is provided, the circular wave drive comprising: a substantially enclosed housing having a chamber therein, wherein the periphery of the chamber is defined by a circular wall, wherein the circular wall includes an inner diameter, and wherein the circular wall includes a friction element; a ring-shaped wheel residing in the chamber, wherein the ring-shaped wheel includes both an external friction element and an internal friction element, wherein the ring-shaped wheel includes a hollow central portion including an inner wall having an inner diameter, the inner wall including the internal friction element, wherein the inner wall of the ring-shaped wheel is axially divided into a non-friction element portion and a friction element portion, wherein the ring-shaped wheel includes an outer diameter, and wherein the ring-shaped wheel outer diameter is less than the inner diameter of the circular wall; a wave generator having a wheel-driving portion that is oriented within the hollow central portion of the ring-shaped wheel, wherein the wave generator includes an eccentrically mounted input shaft extending from the wheel-driving portion and through the housing; and an output element having a wheel-driven portion that is oriented within the hollow central portion of the ring-shaped wheel opposite the wheel-driving portion of the wave generator, wherein the output element includes an output shaft that extends from the wheel-driven portion and through the housing in an opposite direction of the input shaft of the wave generator, and wherein a peripheral face of the wheel-driven portion includes a friction element being in contact with the internal friction element of the ring-shaped wheel.

BRIEF DESCRIPTION OF THE DRAWINGS

The accompanying figures, which are incorporated in and constitute a part of the specification, illustrate various example systems, apparatuses, and methods, and are used merely to illustrate various example embodiments. In the figures, like elements bear like reference numerals.

FIG. 9 is a flowchart illustrating an example method for determining a reduction radio of a circular wave drive.

DETAILED DESCRIPTION

Figure 1A:
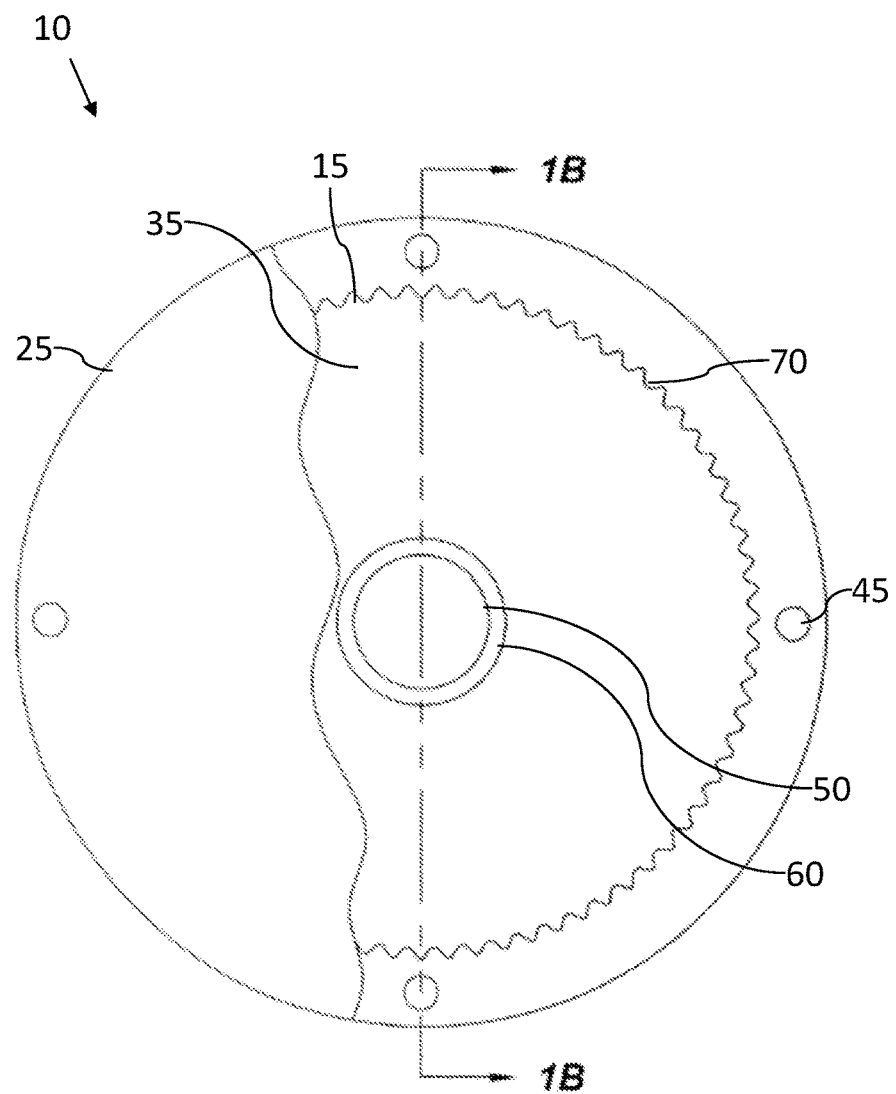
FIG. 1A is a front cut-away view of an example embodiment of a housing 10 of one example embodiment of a circular wave drive.

Example circular wave drive embodiments disclosed herein may be of simpler construction than known harmonic and cycloidal drives. Example circular wave drive embodiments disclosed herein may also be compact in size, offer a large range of speed reduction ratios, and operate with little to no backlash.

Generally speaking, example circular wave drive embodiments disclosed herein may include a housing having a circular chamber therein. The housing may include a cover that closes a cavity in the housing so as to form the enclosed circular chamber. Teeth may be disposed along an inside circular wall of the chamber. A ring-shaped wheel with a hollow central portion may reside within the chamber. The wheel may include external teeth that mesh with the teeth located along the circular inner wall of the housing. The wheel diameter may be smaller than the chamber diameter, such that only a portion of the wheel teeth are meshed with the internal housing teeth at any given time. The wheel may also include teeth that are disposed along a portion of the inner wall thereof.

In another embodiment, neither the inside circular wall of the chamber nor the ring-shaped wheel include teeth, but rather, a friction between the inside circular wall of the chamber and the ring-shaped wheel causes each to at least partially engage the other. Friction may exist naturally between the materials of the inside circular wall of the chamber and the ring-shaped wheel, or friction may be enhanced via a frictional element placed between the inside circular wall of the chamber and the ring-shaped wheel. Such a frictional element may include a surface feature or surface treatment to at least one of the inside circular wall of the chamber and the ring-shaped wheel, including for example, knurled surface to enhance friction. In another embodiment, a friction element may include a separate material, such as a rubber, polymer, or the like, placed between the inside circular wall of the chamber and the ring-shaped wheel.

Example circular wave drive embodiments disclosed herein may also include a wave generator. The wave generator may include an input shaft portion and a wheel-driving portion. The wheel-driving portion of the wave generator may have a circular shape in cross-section, and the input shaft portion may be offset from the central axis of the wheel-driving portion so as to impart an eccentric motion thereto when rotated. The long axis of the wheel-driving portion of the wave generator may be of smaller dimension than the inner diameter of the wheel. The wheel-driving portion of the wave generator and the hollow central portion of the wheel may be press fit onto the inner and outer races of a bearing, such that the wave generator's peripheral surface may be aligned with and is in sliding contact with a non-toothed section of the wheel inner wall. The input shaft portion of the wave generator may extend through an opening in the housing.

Example circular wave drive embodiments may also employ an output element. The output element may include a circular-shaped wheel-driven portion having external peripheral teeth, and an output shaft portion that extends therefrom. The wheel-driven portion of the output element may reside within the housing chamber and may be located within the hollow central portion of the wheel opposite the wheel-driving portion of the wave generator. The diameter of the wheel-driven portion of the output element may be smaller than the inner diameter of the wheel, such that the toothed peripheral surface of the wheel-driven portion is aligned with and is in partial contact with a toothed section of the wheel inner wall. The output shaft portion of the output element may extend through an opening in the housing. The output shaft portion of the output element may be coaxially located with the input shaft portion of the wave generator but may extend from the housing in an opposite direction. Both the input shaft of the wave generator and the output shaft of the output element may pass through bearings.

In operation, the input shaft of the wave generator may be connected to a rotation-imparting actuator, such as an electric drive motor. The actuator may impart rotational motion to the wave generator, which may cause the wheel driving portion thereof to rotate within the wheel. Rotation of the wave generator wheel-driving portion may cause a rotation of the wheel along the inner wall of the housing (which may be referred to as self-rotation), which wheel rotation may cause a rotation of the output element at a like rotational speed.

Because the external peripheral surface of the wheel-driving portion of the wave generator and the mating surface of the inner wall of the wheel may be separated by the bearing, the coefficient of friction between the wheel-driving portion of the wave generator and the mating surface of the inner wall of the wheel may be extremely low. Consequently, the wheel may not rotate in turn with the wave generator wheel driving portion but, rather, may slide along the peripheral surface of the wave generator wheel-driving portion. This may result in a wheel rotational speed that is less than the rotational speed of the wave generator and associated actuator. The overall speed reduction between the input and output side of the circular wave drive may depend upon at least one of: the diameter of the wave generator, the external periphery of the wheel, the inner wall of the housing, the external periphery of the output element, and the numbers of teeth on each of the above four surfaces. A large diameter may not necessarily have more teeth than a small diameter when two surfaces meet. With various combinations of the diameters and the numbers of teeth, the magnitude of the speed reduction may cover a large range, for example from 30:1 to 10,000:1, which may not be possible through the use of existing devices.

Figure 4A:
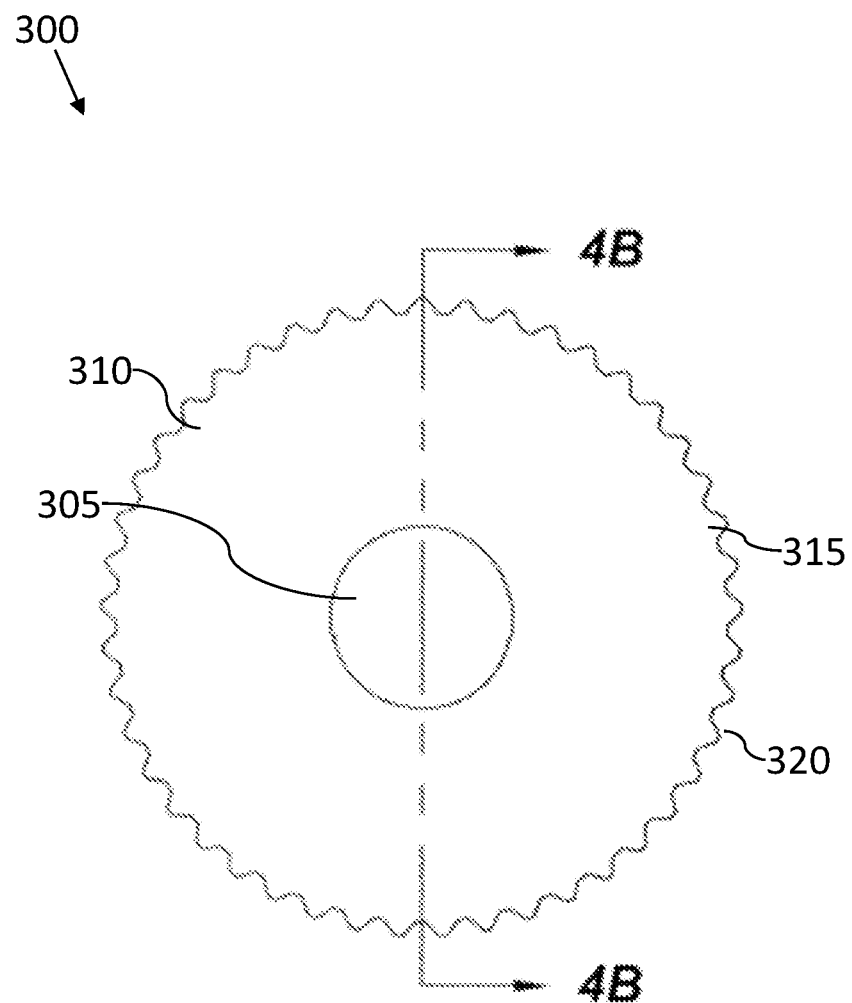
FIG. 4A is a rear view of an example embodiment of an output element 300 of one example embodiment of the circular wave drive.
Figure 4B:
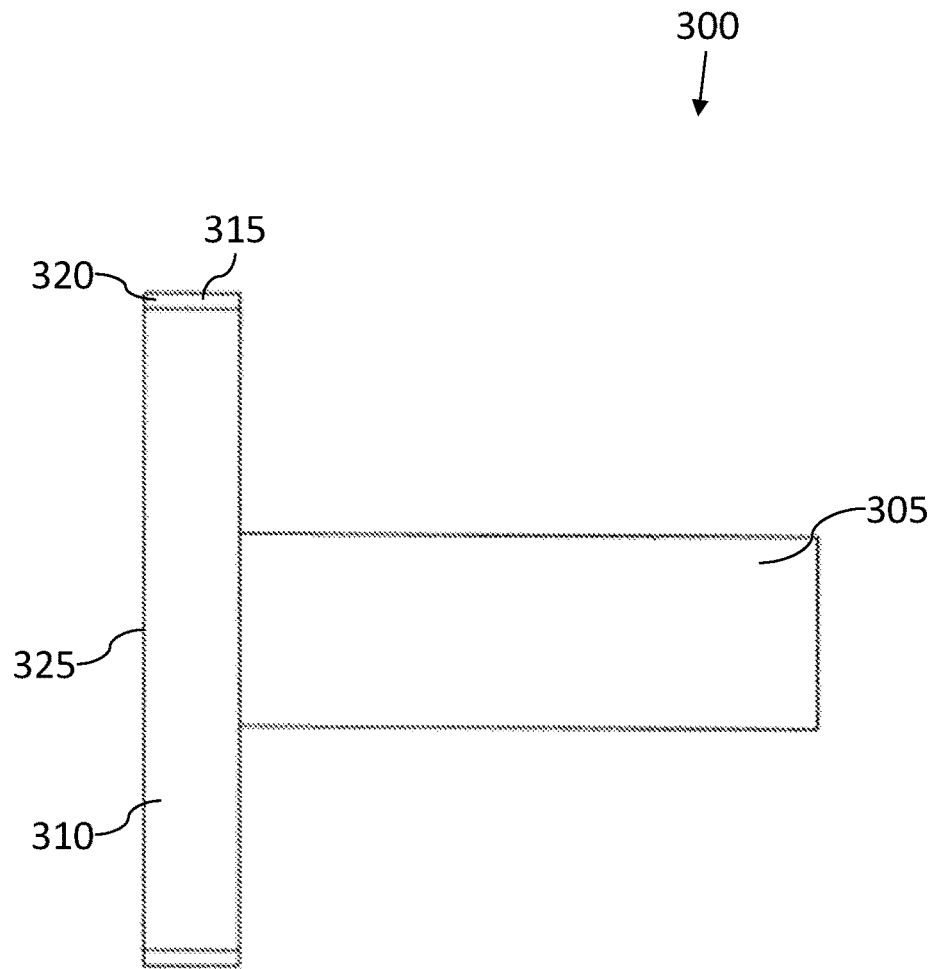
FIG. 4B is a side view of output element 300.
Figure 5:
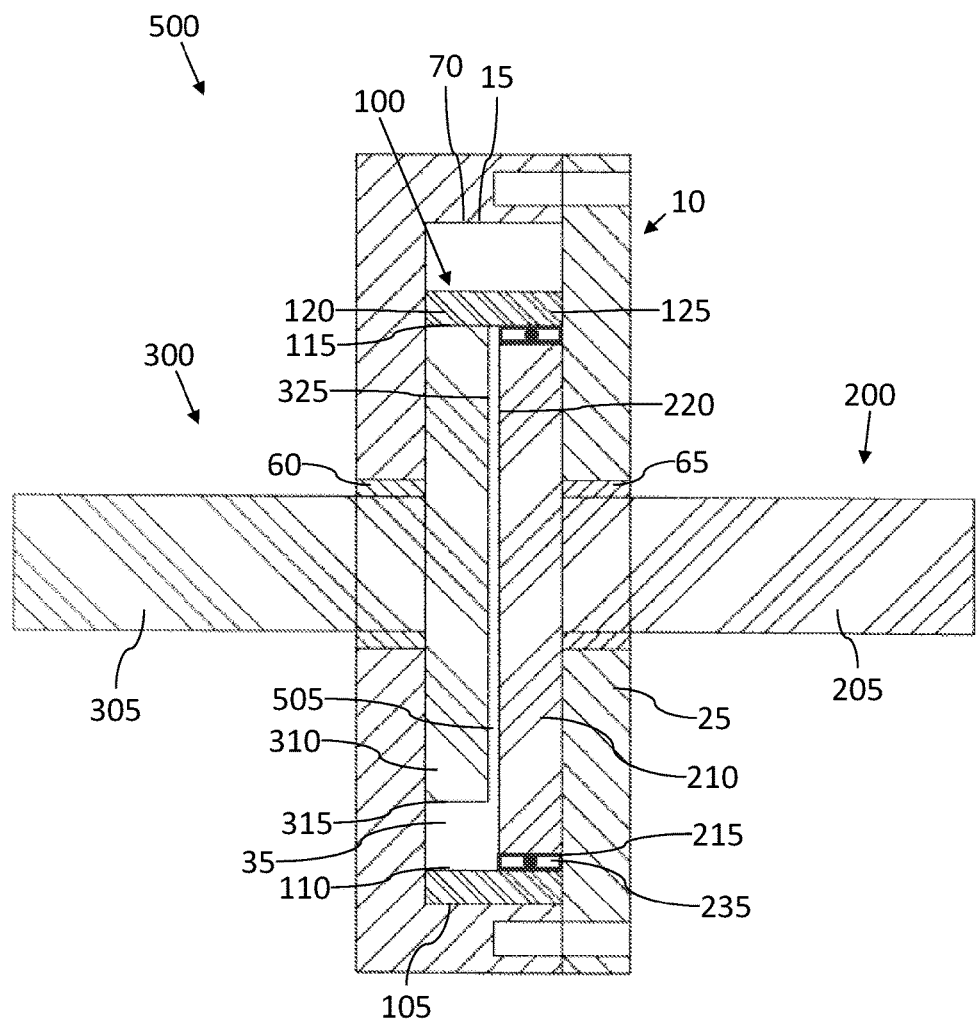
FIG. 5 is a sectional assembly view of one example embodiment of the circular wave drive, including a bearing 235.

FIG. 5 illustrates an assembled example embodiment of a circular wave drive 500. FIGS. 1A-4B illustrate the various components making up circular wave drive 500. As illustrated in FIG. 5, circular wave drive 500 includes a housing 10, a wheel 100, a wave generator 200, and an output element 300.

Circular wave drive 500 may include a variety of components, any of which may comprise any of a variety of materials, including for example: a metal, an alloy, a composite, a polymer, a rubber, a ceramic, an organic material, and the like.

Figure 1B:
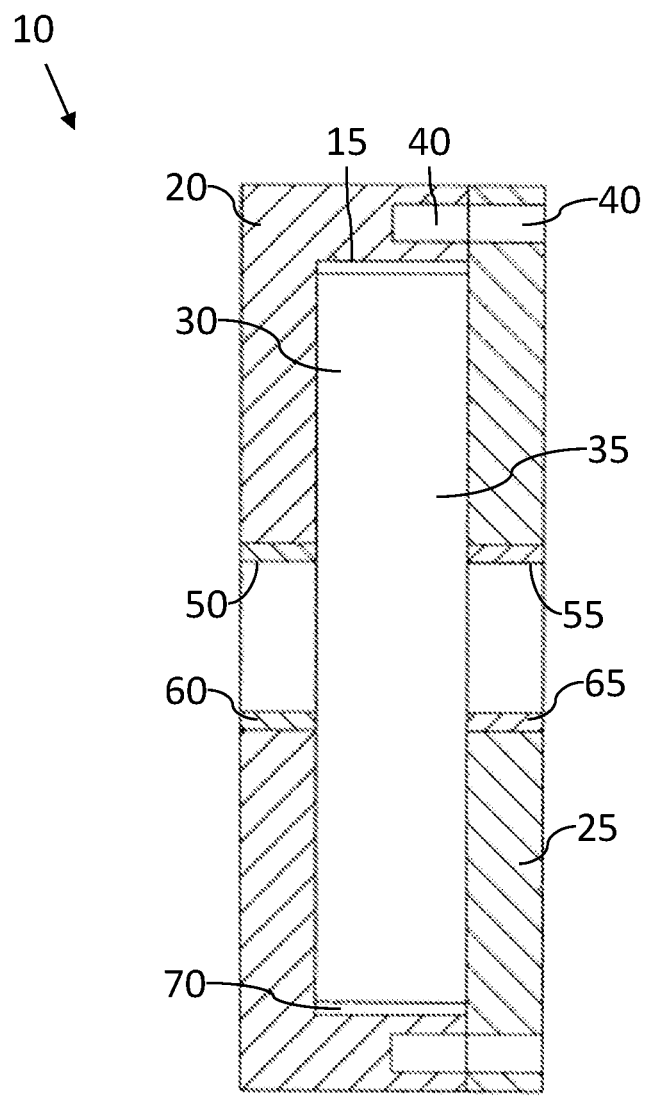
FIG. 1B is a sectional side view of housing 10.

FIG. 1A is a front cut-away view of an example embodiment of housing 10. FIG. 1B is a sectional side view of housing 10. Housing 10 may include an external shape having any of a variety of shapes, including for example, a disc shape. Housing 10 may include an internal peripheral wall 15 having a circular shape. In one embodiment, housing 10 may include any of a variety of external shapes, but internal peripheral wall 15 must have a circular shape. Housing 10 may be substantially hollow.

Housing 10 may include a main body portion 20. Main body portion 20 may include a base and at least one side defining a cavity 30.

Housing 10 may include a cover element 25. Cover element 25 may selectively close cavity 30 in main body portion 20. Cover element 25 may selectively close cavity 30 in main body portion 20 so as to form a circular chamber 35 within housing 10.

Cover element 25 may be attached to main body portion 20 of housing 10 using any of a variety of fasteners, including for example, threaded fasteners (not shown). The threaded fasteners may pass through and into aligned and cooperating holes 40, 45 in cover element 25 and main body portion 20, respectively. Any other fastener device capable of selectively or permanently maintaining cover element 25 in contact with main body portion 20 may be utilized.

Main body portion 20 may include an opening 50. Cover element 25 may include an opening 55. Openings 50 and 55 may be coaxially aligned. Coaxially aligned openings 50, 55 may be oriented within housing 10 for permitting the passage of portions of a wave generator and an output element, respectively (not shown). Openings 50 and 55 may be concentric with internal peripheral wall 15.

Bearings 60 and 65 may be retained within each of the openings 50 and 55, respectively. Bearings 60, 65 may facilitate rotation of the wave generator and the output element (not shown). Bearings 60, 65 may be affixed to respective opposite surfaces of housing 10 to facilitate rotation of the wave generator and the output element (not shown). Bearings 60, 65 may be operatively connected to housing 10 in any manner in which to facilitate rotation of the wave generator and the output element (not shown).

In one embodiment, housing 10 may include one or more friction element 70 oriented along internal peripheral wall 15 in chamber 35. Friction element 70 may be configured to engage a corresponding wheel (not shown). Friction element 70 may include any of a variety of elements for increasing the friction between internal peripheral wall 15 and a corresponding wheel, including for example: gear teeth, knurled surface, raised elements, indented elements, rubber elements, polymer elements, and the like.

In one embodiment, friction element 70 may include a rubber element for increasing the friction between internal peripheral wall 15 and a corresponding wheel. In one embodiment, housing 10 does not include a friction element 70 oriented along internal peripheral wall 15, but rather a friction element may be oriented along an outer periphery of a wheel that corresponds to internal peripheral wall 15.

In one embodiment, one or more friction element 70 may include one or more teeth oriented along internal peripheral wall 15 in chamber 35. Friction element 70 may be configured to engage a correspondingly-toothed wheel (not shown).

Figure 2A:
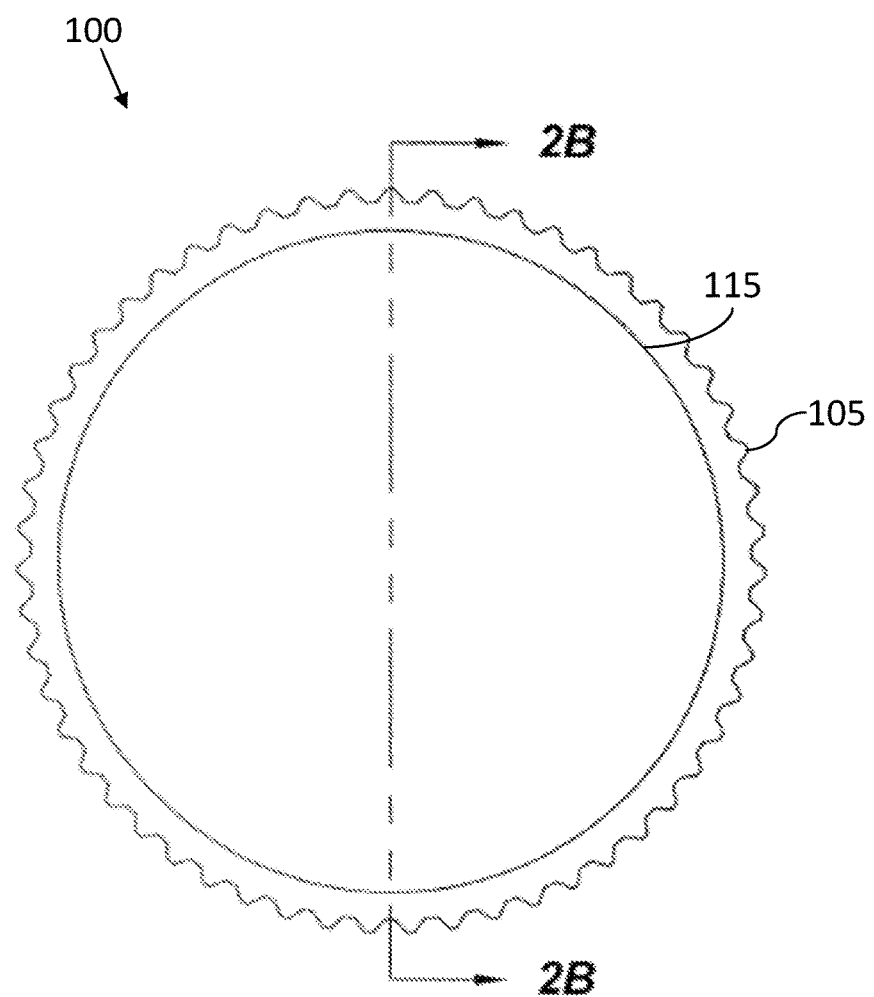
FIG. 2A is a front view of an example embodiment of a wheel 100 of one example embodiment of the circular wave drive.
Figure 2B:
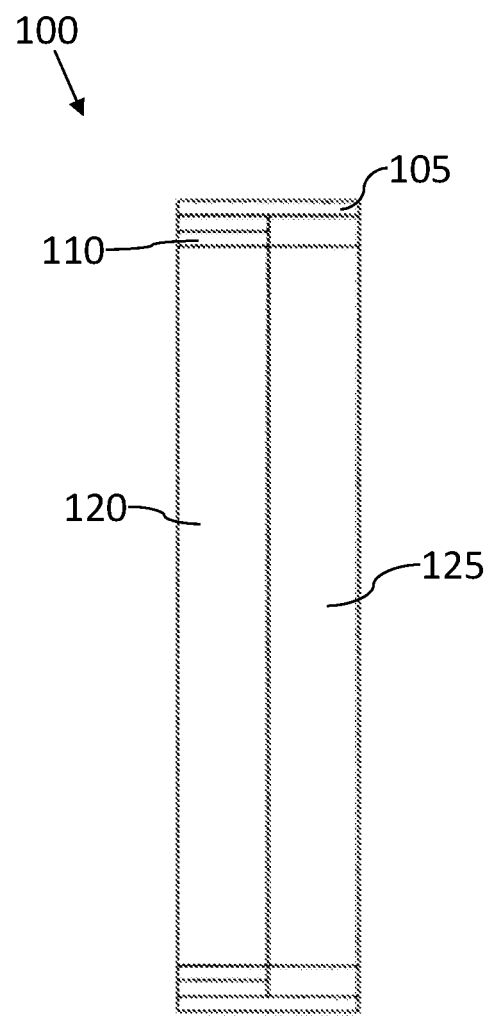
FIG. 2B is a sectional side view of wheel 100.

FIGS. 2A and 2B illustrate a front view of an example embodiment of a wheel 100, and a sectional side view of wheel 100, respectively. Wheel 100 may be a substantially ring-shaped, or annular, wheel with a hollow central portion defined by an inner wall 115. Wheel 100 may be oriented within chamber 35 in housing 10 when circular wave drive 500 is assembled.

Wheel 100 may include an external friction element 105 for increasing the friction between wheel 100 and internal peripheral wall 15. External friction element 105 may include any of a variety of elements for increasing the friction between internal peripheral wall 15 and wheel 100, including for example: gear teeth, knurled surface, raised elements, indented elements, rubber elements, polymer elements, and the like.

In one embodiment, external friction element 105 may include a rubber element for increasing the friction between internal peripheral wall 15 and wheel 100. In one embodiment, housing 10 does not include a friction element 70 oriented along internal peripheral wall 15, but rather wheel 100 may include external friction element 105 oriented along an outer periphery of wheel 100 that corresponds to internal peripheral wall 15. In another embodiment, wheel 100 does not include external friction element 105, but rather, housing 100 includes friction element 70 oriented along internal peripheral wall 15.

In one embodiment, external friction element 105 may include one or more teeth oriented along wheel 100. External friction element 105 may be configured to engage the corresponding teeth in friction element 70 of peripheral wall 15 in chamber 35.

At least one of friction element 70 and external friction element 105 may be configured to at least one of reduce, mitigate, and eliminate slippage between internal peripheral wall 15 and wheel 100.

The outer diameter of wheel 100 may be smaller than the diameter of internal peripheral wall 15. In one embodiment, only a portion of external friction element 105 of wheel 100 engage with the internal peripheral wall 15 and friction element 70 at any given time. In one embodiment, the outer diameter of wheel 100 is smaller than the diameter of internal peripheral wall 15.

Wheel 100 may include an internal friction element 110 disposed along a portion of inner wall 115. Internal friction element 110 may include any of a variety of elements for increasing the friction between inner wall 115 and a circular wave drive output element (illustrated at 300 in FIGS. 4A and 4B), including for example: gear teeth, knurled surface, raised elements, indented elements, rubber elements, polymer elements, and the like.

In one embodiment, inner wall 115 of wheel 100 is axially divided into a friction element portion 120 and a non-friction element portion 125.

Figure 6:
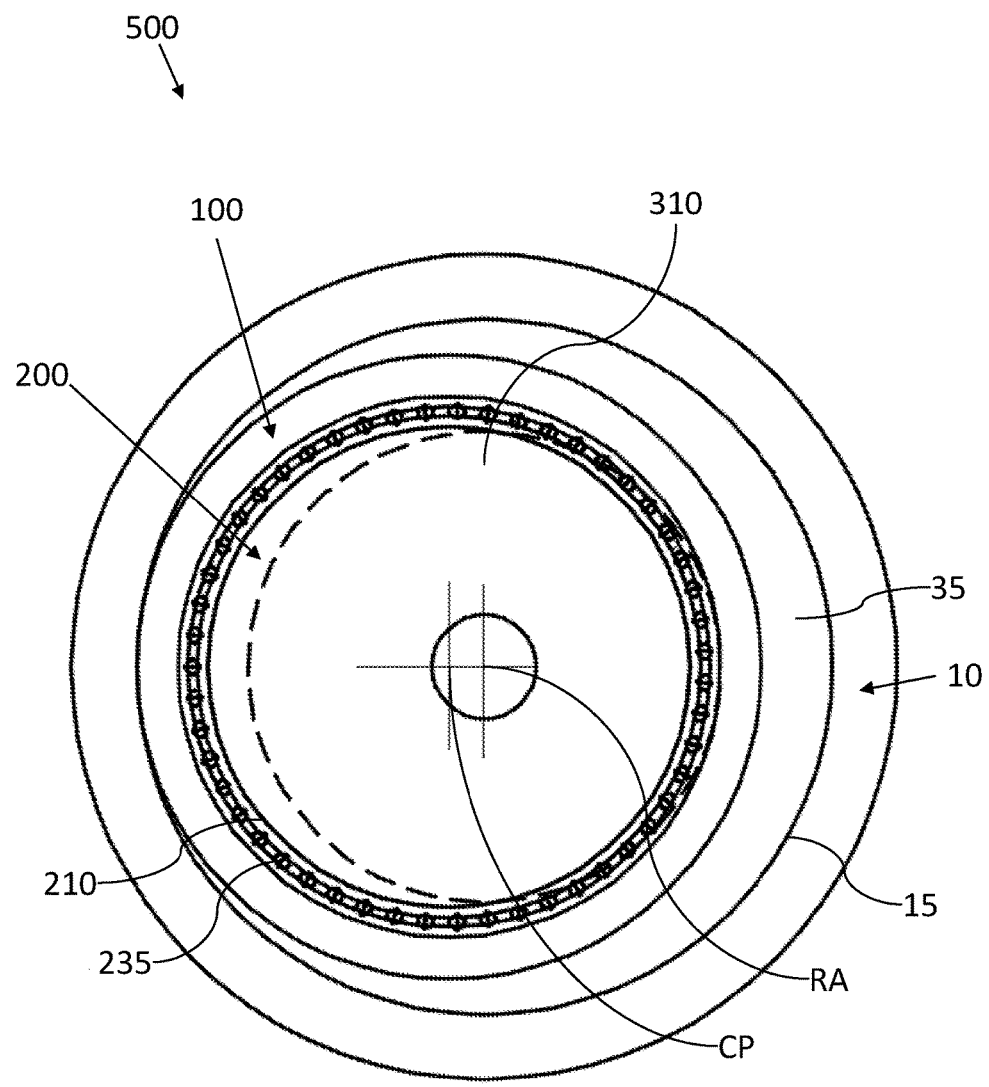
FIG. 6 is a schematic representation of the relationship and movement patterns of the various components of an example embodiment of the circular wave drive.

In one embodiment, non-friction element portion 125 of inner wall 115 may be press fit onto the outer race of a bearing (illustrated at 235 in FIGS. 5 and 6).

In one embodiment, the inner race of bearing 235 may be press fit onto the surface of a wheel-driving portion (illustrated at 210 in FIGS. 3A-3C) of a wave generator 200.

Friction element portion 120 of inner wall 115 may be adapted to engage with an external friction element 315 of circular wave drive output element 300, each of which is illustrated in FIGS. 4A and 4B.

Figure 3A:
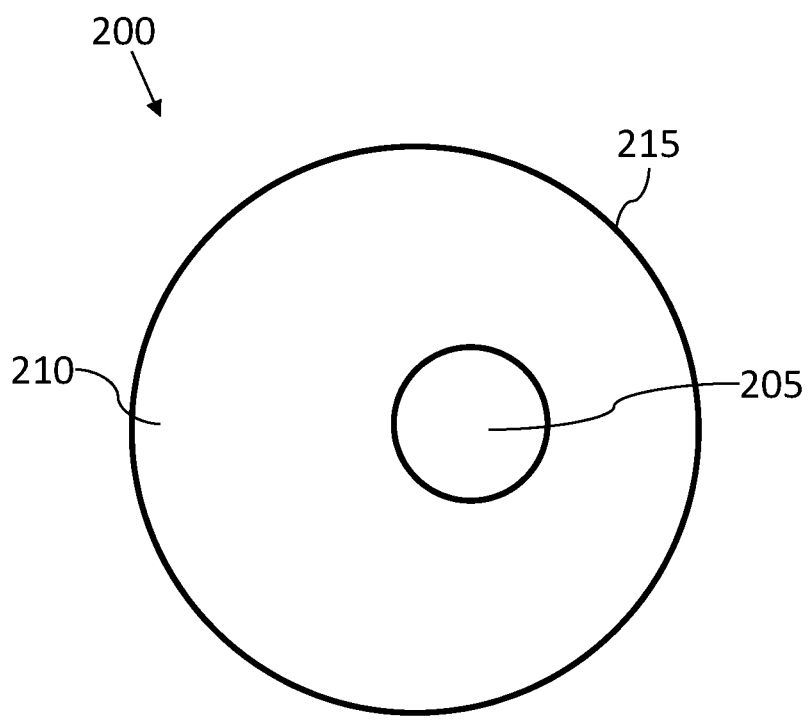
FIG. 3A is a front view of an example embodiment of a wave generator 200 of one example embodiment of the circular wave drive.
Figure 3B:
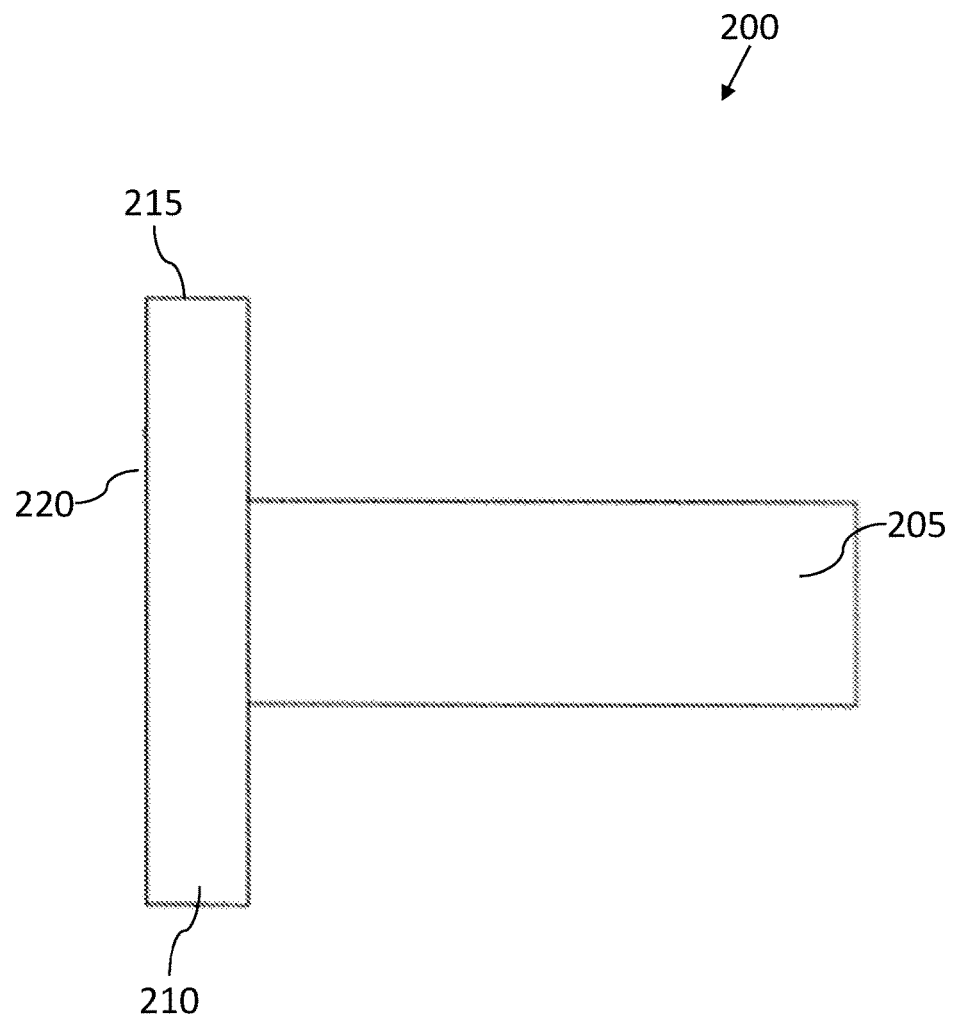
FIG. 3B is a side view of wave generator 200.
Figure 3C:
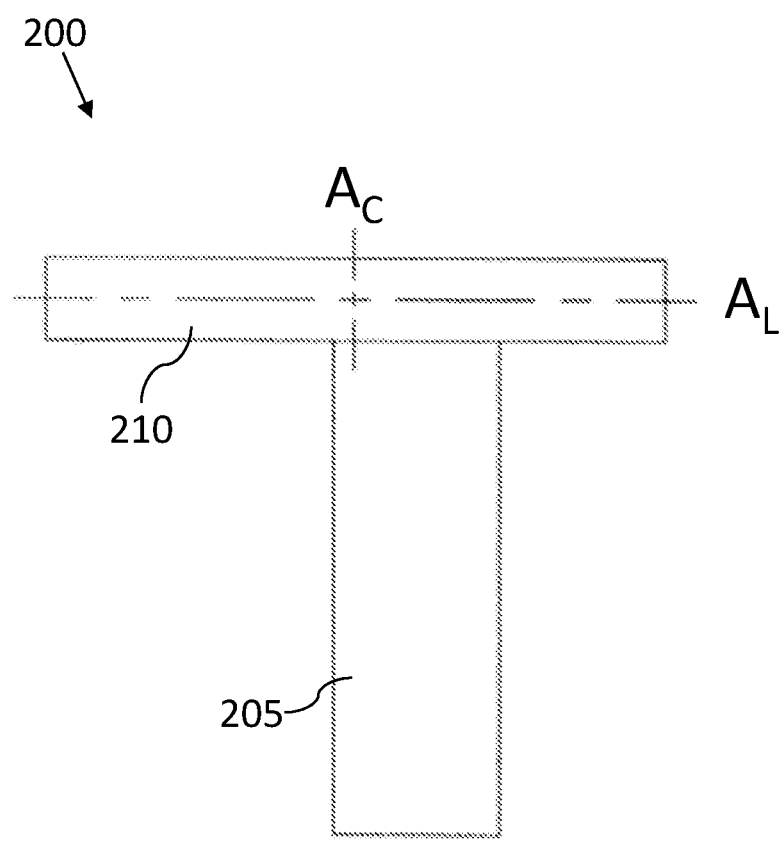
FIG. 3C is a top view of wave generator 200.

FIGS. 3A-3C illustrate a front view of an example embodiment of a wave generator 200, a side view of wave generator 200, and a top view of wave generator 200, respectively.

Wave generator 200 may include an input shaft portion 205 and a wheel-driving portion 210.

Input shaft portion 205 may be operatively connected to a rotation-imparting actuator such as, for example, an electric drive motor. Input shaft portion 205 may be connected to any of a variety of rotation-imparting actuators.

Wheel-driving portion 210 may engage non-friction element portion 125 of inner wall 115 of wheel 100. Wheel-driving portion 210 may engage non-friction element portion 125 of wheel 100 via bearing 235 (illustrated in FIGS. 5 and 6). In one embodiment, wheel-driving portion 210 may engage non-friction element portion 125 of wheel 100 via bearing 235 to maintain a very low friction engagement between wheel-driving portion 210 and wheel 100 when wheel 100 and wave generator are assembled into circular wave drive 500.

Wheel-driving portion 210 may include any of a variety of cross-sectional shapes, including for example, a circular shape, a racetrack shape, and the like.

The center of input shaft portion 205 may be offset from the central axis $A_C$ of wheel-driving portion 210 so as to impart an eccentric motion to wheel-driving portion 210 when wave generator 200 is rotated.

A peripheral face 215 of wheel-driving portion 210 may be void of a friction element. Peripheral face 215 of wheel-driving portion 210 may engage the inner race of bearing 235. Peripheral face 215 of wheel-driving portion 210 may be press fit into the inner race of bearing 235.

The dimension of wheel-driving portion 210 along its long axis $A_L$ may be less than the inner diameter of inner wall 115 of wheel 100. In one embodiment, wheel-driving portion 210 includes a dimension along its long axis $A_L$ that is less than the inner diameter of inner wall 115.

When circular wave drive 500 is assembled, wheel-driving portion 210 of wave generator 200 may be oriented within housing 10's chamber 35. When circular wave drive 500 is assembled, wheel-driving portion 210 may be located within the hollow portion of wheel 100. When circular wave drive 500 is assembled, wheel-driving portion 210 may be separated by bearing 235 from non-friction element portion 125 of inner wall 115 of wheel 100.

In those embodiments in which bearing 235 is utilized, there may be little friction between wheel-driving portion 210 and non-friction element portion 125 of inner wall 115 as wave generator 200 rotates.

Input shaft portion 205 of wave generator 200 may extend through opening 55 in housing 10. Input shaft portion 205 of wave generator 200 may extend through bearing 65 that is operatively connected to opening 55 in cover element 25.

Bearing 65 may be press fit onto input shaft portion 205 of wave generator 200. Bearing 65 may include a set screw or other retention mechanism by which input shaft portion 205 of wave generator 200 may be securely retained in bearing 65. In one embodiment, use of a retention mechanism, or press fitting, may ensure that bearing 65 rotates with input shaft portion 205 of wave generator 200, rather than input shaft portion 205 rotating within the bearing. In one embodiment, use of a retention mechanism, or press fitting, may ensure that bearing 65 and input shaft portion 205 do not move axially relative to one another.

In another embodiment, the position and orientation of wave generator 200 may be reversed, such that input shaft portion 205 extends through opening 50 and bearing 60 located in main body portion 20 of housing 10.

FIGS. 4A and 4B illustrate a rear view of an example embodiment of an output element 300 and a side view of output element 300, respectively. Output element 300 may include an output shaft portion 305. Output element 300 may include a wheel-driven portion 310.

Output shaft portion 305 may be configured to be connected to a load in circular wave drive 500. The load can be any of a variety of loads of which a user desires to cause movement, or upon which a user desires to apply a force.

Wheel-driven portion 310 may be configured to contact and engage friction element portion 120 of inner wall 115 of wheel 100 in circular wave drive 500.

Wheel-driven portion 310 may have any of a variety of cross-sectional shapes, including for example a circular cross-sectional shape. The center of output shaft portion 305 may be coaxially aligned with the center of wheel-driven portion 310, making output shaft portion 305 and wheel-driving portion 310 concentric. A circular motion may be imparted upon output shaft portion 305 when wheel-driving portion 310 is rotated. Friction element 315 may extend from the external peripheral face 320 of output element wheel-driven portion 310.

Friction element 315 may include any of a variety of elements for increasing the friction between wheel-driving portion 310 and inner wall 115 of wheel 100, including for example: gear teeth, knurled surface, raised elements, indented elements, rubber elements, polymer elements, and the like.

The diameter of wheel-driven portion 310 may be less than the inner diameter of inner wall 115 of wheel 100. In one embodiment, the diameter of wheel-driven portion 310 is less than the inner diameter of inner wall 115 of wheel 100. When circular wave drive 500 is assembled, wheel-driven portion 310 of output element 300 may reside within housing chamber 35 and may be located within the hollow portion of wheel 100 opposite wheel-driving portion 210 of wave generator 200.

When circular wave drive 500 is assembled, friction element 315 on peripheral face 320 may be aligned with and may be in constant partial engagement with the teeth internal friction element 110 of friction element portion 120 of inner wall 115 of wheel 100. The point of engagement between friction element 315 and internal friction element 110 of friction element portion 120 of inner wall 115 may change as wheel 100 rotates.

Output shaft portion 305 may extend through opening 50 in housing 10. Output shaft portion 305 may extend through bearing 60 that operatively connected to opening 50 in main body portion 20 of housing 10. Bearing 60 may be press fit onto output shaft portion 305. Bearing 60 may include a set screw or other retention mechanism by which output shaft portion 305 may be securely retained in bearing 60. In one embodiment, use of a retention mechanism, or press fitting, of output shaft portion 305 in bearing 60 may ensure that bearing 60 rotates with output shaft portion 305 rather than output shaft portion 305 rotating within the bearing. In one embodiment, use of a retention mechanism, or press fitting, of output shaft portion 305 in bearing 60 may ensure that output shaft portion 305 and bearing 60 do not move axially relative to one another.

In another embodiment, the position and orientation of output element 300 may be reversed, such that output shaft portion 305 extends through opening 55 and bearing 65 located in cover element 25 of the housing 10. Stated differently, the orientation of wheel 100, wave generator 200 and output element 300 may be reversed relative to housing 10.

FIG. 5 illustrates an assembled example embodiment of a circular wave drive 500, including a possible assembled relationship of housing 10, wheel 100, wave generator 200, bearing 235, and output element 300.

Housing 10 may be closed by cover element 25 so as to form internal chamber 35 with the circular internal peripheral wall 15. Wheel 100 may reside in chamber 35 and a portion of wheel 100's external friction element 105 may be in engagement with a portion of friction element 70 on internal peripheral wall 15 of housing 10.

Wave generator 200 and output element 300 may be installed into housing 10 as described above, such that wheel-driving portion 210 and wheel-driven portion 310 reside within the hollow portion of wheel 100 and input shaft portion 205 and output shaft portion 305 are oppositely directed.

Peripheral face 215 of wheel-driving portion 210 may be oriented (including via a press fit, for example) onto an inner race of bearing 235. Non-friction element portion 125 of wheel inner wall 115 may be oriented (including via a press fit, for example) press fit onto the outer race of bearing 235.

A portion of external friction element 315 on output element wheel-driven portion 310 may be in engagement with a portion of internal friction element 110 of friction element portion 120 of wheel inner wall 115.

The thickness (axial direction) dimensions of wave generator wheel-driving portion 210 and output element wheel-driven portion 310 may be such that a gap 505 exists between adjacent faces 220 and 325 when wave generator 200 and output element 300 are installed into housing 10. Gap 505 may prevent at least one of: contact, friction, and interference between wave generator 200 and output element 300 during operation of circular wave drive 500. Gap 505 may be maintained by retention of wave generator 200 and output element 300 by respective bearings 65 and 60.

In one embodiment, bearing 235 may be oriented between wheel 100 and wave generator 200. Bearing 235 may be any of a variety of bearings, including for example a ball bearing, a roller bearing, a needle bearing, and the like. Bearing 235 may include an inner race and an outer race. Bearing 235 may include an inner race operatively connected to wave generator 200. Bearing 235 may include an outer race operatively connected to wheel 100. Bearing 235 may include an inner race connected to wave generator 200. Bearing 235 may include an outer race connected to wheel 100.

In the operation of assembled circular wave drive 500, input shaft portion 205 of wave generator 200 may be connected to an electric drive motor or another rotation-imparting actuator. Input shaft portion 205 may be operatively connected to any of a variety of rotation-imparting actuators, including for example: a motor, an engine, a wind turbine, a water wheel, a human input, an animal input, and the like.

The actuator may impart rotational motion to wave generator 200, which may cause wheel-driving portion 210 to rotate eccentrically within wheel 100. Because of bearing 235's orientation between external peripheral surface 215 of wheel-driving portion 210 and the mating surface of non-friction element portion 125 of inner wall 115 of wheel 100, wheel 100 may not rotate directly with wave generator wheel-driving portion 210 but, rather, may slide along external peripheral surface 215. This action may result in a rotational speed of wheel 100 that is less than the rotational speed of wave generator 200 and the associated actuator.

As illustrated in FIGS. 5 and 6, the motion of wheel 100 with respect to inner wall 15 of housing 10 may also be eccentric as a result of the eccentric motion of the wheel-driving portion 210. Rotation of wheel 100 by wave generator 200 may cause wheel 100 to travel along inner wall 15 of housing 10, with a changing portion of external friction element 105 of wheel 100 being in engagement with a changing portion of friction element 70 of housing 10 during wheel 100's movement. Wheel 100 may self-rotate as a result of wheel 100's engagement with housing 10. Wheel 100 may roll as a result of wheel 100's engagement with wave generator 200. Wheel 100 may both self-rotate and roll as a result of wheel 100's engagement with housing 10 and wave generator 200, respectively.

Wheel-driving portion 210 may rotate about a rotational axis RA illustrated in FIG. 6. Rotational axis RA may be offset from wheel-driving portion 210's center point CP, which is also illustrated in FIG. 6. In this manner, rotation of wheel-driving portion 210 about rotational axis RA may induce an eccentric motion within wave generator 200.

A portion of external friction element 315 on output element 300 may also be in engagement with a portion of internal friction element 110 disposed along friction element portion 120 of wheel inner wall 115. As a result of an engagement between external friction element 315 and internal friction element 110, rotation of wheel 100 by wave generator 200 may also cause a rotation of output element 300. Changing portions of external friction element 315 on output element 300 may become engaged and disengaged with changing portions of internal friction element 110 of wheel 100 during rotation. However, while rotation of wheel 100 is eccentric in nature, rotation of output element 300 is not. That is, rotation of output element 300 is about an axis that is substantially coaxial with output shaft portion 305 and wheel-driven portion 310.

The rotational speed of output element 300 may be the same as, greater than, or less than the rotational speed of wheel 100. Because output shaft portion 305 of output element 300 and input shaft portion 205 of wave generator 200 are coaxially aligned, input shaft portion 205 and output shaft portion 305 have the same axis of rotation.

The rotational direction of output element 300 may be opposite the rotational direction of wave generator 200.

In one embodiment, the overall speed reduction between the input side and the output side of circular wave drive 500 may depend on the diameter of inner wall 15 of housing 10, the diameter of the external periphery surface of wheel 100, the diameter of internal wall 115 of wheel 100, and the diameter of wheel-driven portion 310. In another embodiment, the overall speed reduction between the input side and the output side of circular wave drive 500 may depend on the number of teeth in friction element 70 on inner wall 15 of housing 10, the number of teeth in external friction element 105 on the external periphery surface of wheel 100, the number of teeth in internal friction element 110 on inner wall 115 of wheel 100, and the number of teeth on output element friction element 315.

In one embodiment, the number of teeth in friction element 70 on inner wall 15 of housing 10 can be the same as, greater than, or less than the number of teeth in external friction element 105 on the external periphery surface of wheel 100, although the diameter of inner wall 15 may be greater than the diameter of the external periphery surface of wheel 100. In one embodiment, the number of teeth in internal friction element 110 on inner wall 115 of wheel 100 can be the same as, greater than, or less than the number of teeth on the output element friction element 315, although the diameter of inner wall 115 of wheel 100 may be greater than the diameter of wheel-driven portion 310 of output element 300.

In one embodiment, because the speed reduction is determined by eight parameters, including the four diameters and four numbers of teeth, it can be understood that the amount of speed reduction achieved is highly adjustable and wide-ranging, and also that the magnitude of the speed reduction may be substantial. The two features cannot be achieved by any of the existing devices.

Where circular wave drive 500 includes friction elements comprising gear teeth, and wherein each of the gear teeth has the same circumferential length, the reduction ratio of the input to output can be calculated via the following equation:

$$\text{Reduction Ratio} = (N1 - N3)/N3$$

where N1=the number of teeth on friction element 70 on inner wall 15 of housing 10; and where N3=the number of teeth on output element friction element 315.

Figure 7:
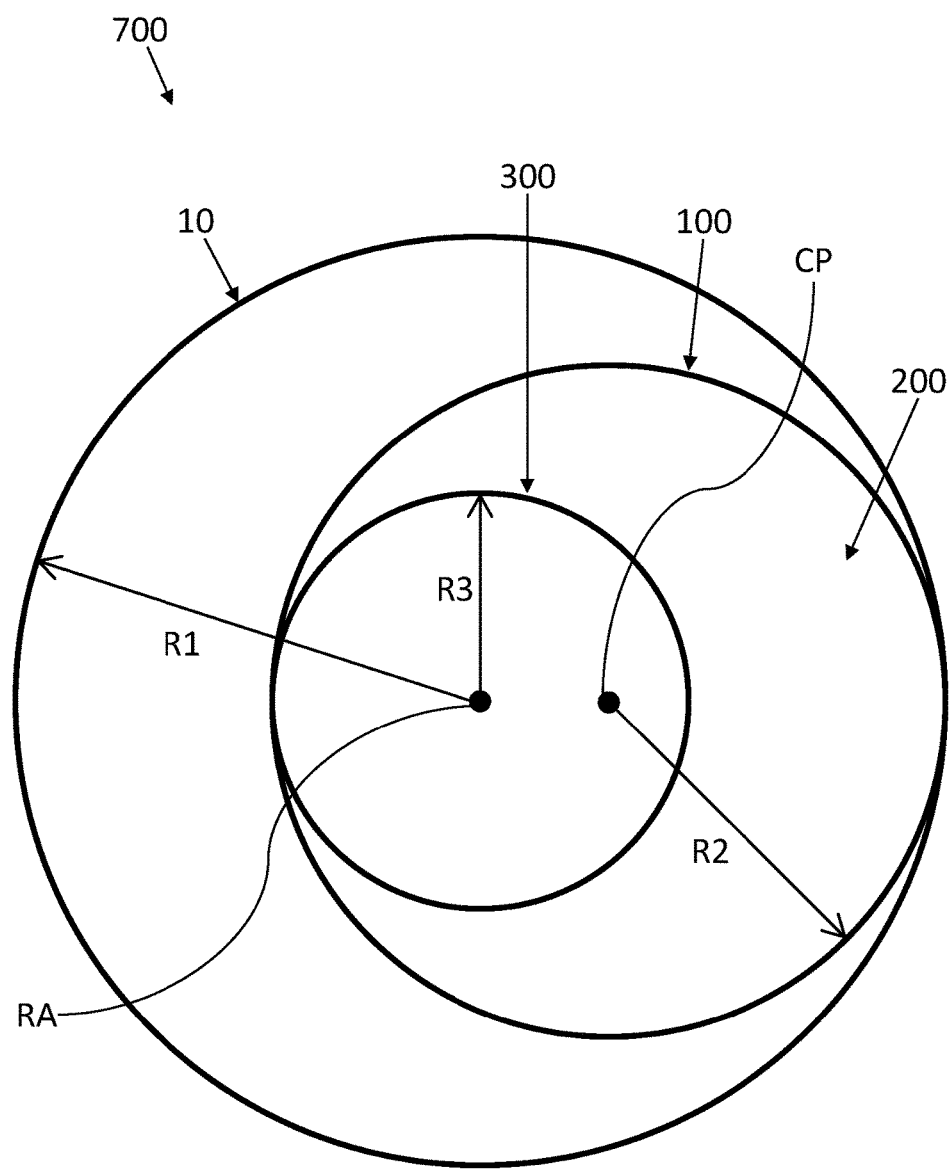
FIG. 7 is a schematic representation of the relationship and movement patterns of the various components of an example embodiment of a circular wave drive 700.

FIG. 7 illustrates a schematic representation of the relationship and movement patterns of the various components of an example embodiment of circular wave drive 700. Circular wave drive includes a housing 10 having an inner radius R1, a wheel 100 having an inner radius R2 and encompassing a wave generator 200, and an output element 300 having an outer radius R3.

Wave generator 200 may rotate about a rotational axis RA. Wave generator 200 may have a center point CP. As illustrated in FIG. 7, rotational axis RA may be offset from center point CP, thus causing an eccentric rotation of wave generator 200 and wheel 100 when wave generator 200 is rotated about rotational axis RA.

Where circular wave drive 700 includes friction elements not comprising gear teeth, and wherein no slippage exists between wheel 100 and housing 10, the reduction ratio of the input to output can be calculated via the following equation:

$$\text{Reduction Ratio} = (R1-R3)/R3$$

where R1=the inner radius of wall 15 of housing 10; and
where R3=the outer radius of output element 300.

As a result, when wave generator 200 rotates one time, output element 300 rotates at the reduction ratio. For example, where the reduction ratio is 1:100, one rotation of wave generator 200 results in $1/100^{th}$ rotation of output element 300.

In one embodiment, circular wave drives 500 and 700 are backdrivable, such that force input to output element 300 may cause rotation of wave generator 200 and its input shaft. As a result, circular wave drives 500 and 700 may be backdrivable at the inverse of the reduction ratio. For example, where the reduction ratio us 1:100, one rotation of output element 300 may cause 100 rotations of wave generator 200 and its input shaft.

Where wheel 100 and housing 10 engage one another without slippage, wheel 100 both self-rotates (as a result of engagement with housing 10) and rolls (as a result of engagement with wave generator 200). Where wheel 100 and housing 10 do not engage one another without slippage, wheel 100 rolls (as a result of engagement with wave generator 200) without self-rotating.

Figure 8:
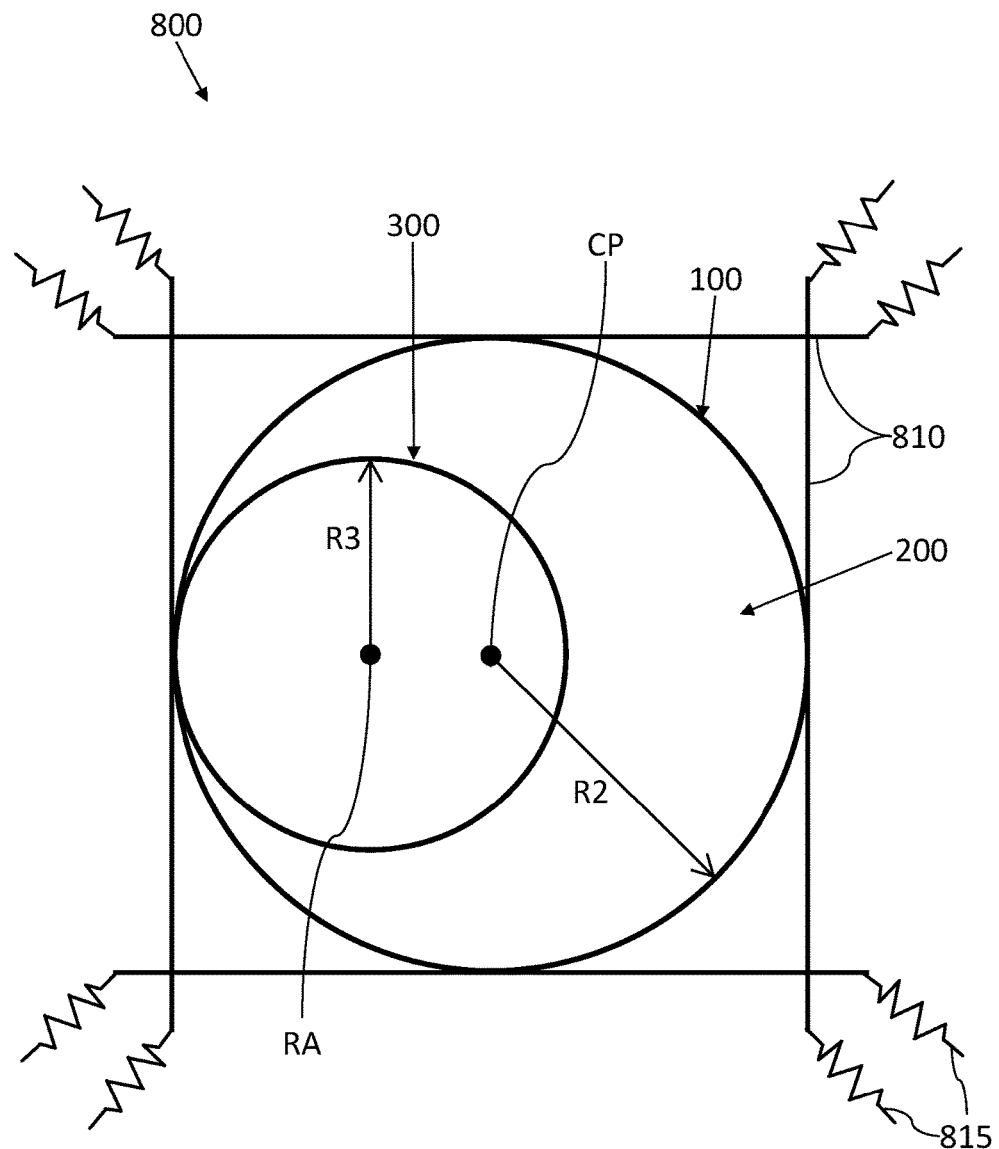
FIG. 8 is a schematic representation of an example embodiment of a circular wave drive 800.

FIG. 8 illustrates a schematic representation of an example embodiment of a circular wave drive 800. Circular wave drive 800 may include a wheel 100 having an inner radius R2 and containing a wave generator 200, and an output element 300 having an outer radius R3. Circular wave drive 800 may include at least two wall elements 810 oriented generally radially outwardly of wheel 100, wave generator 200, and output element 300. Circular wave drive 800 may include biasing elements 815 configured to bias wall elements 810 in a generally radially inward direction. In one embodiment, the shape of the housing may be any of a variety of shapes, including for example: square, rectangular, pentagonal, hexagonal, octagonal, elliptical, and the like. The shape of the housing may be any of a variety of regular shapes. The shape of the housing may be any of a variety of irregular shapes.

Wheel 100, wave generator 200, and output element 300 may be substantially similar to those described herein above. Wave generator 200 may rotate about a rotational axis RA. Wave generator 200 may include a center point CP offset from rotational axis RA.

At least two wall elements 810 may include any of a variety of elements capable of providing force against wheel 100. At least two wall elements 810 may include rigid elements, resilient elements, or a combination thereof. At least two wall elements 810 may include substantially planar elements.

At least two wall elements 810 may include at least three wall elements, at least four wall elements, at least five wall elements, or more than five wall elements. At least two wall elements 810 may substantially encompass wheel 100.

Biasing elements 815 may include any elements configured to bias at least two wall elements 810 into engagement with wheel 100. Biasing elements 815 may include any of a variety of elements configured to bias an object, including for example: springs, shocks, resilient members such as rubber bands or straps, and the like.

At least two wall elements 810 may act in place of housing 10 disclosed herein above. Wall elements 810 may be configured to provide a force upon wheel 100. Wall elements 810 may be configured to provide a friction upon wheel 100. Wheel 100 may engage wall element 810 with slippage, and as such may roll (due to engagement with circular wave drive 200) without self-rotating.

Wall elements 810 may include a slippage element, configured to reduce or eliminate friction upon wheel 100. The slippage element may include any of a variety of elements for reducing friction between two components, including for example: a bearing, a lubricant, a bearing surface, a rigid surface, and the like.

Where circular wave drive 800 includes friction elements not comprising gear teeth, and wherein slippage exists between wheel 100 and at least one wall element 810, the reduction ratio of the input to output can be calculated via the following equation:

$$\text{Reduction Ratio} = (R2-R3)/R3$$

where R2=the inner radius wheel 100; and
where R3=the outer radius of output element 300.

It is understood that circular wave drives 500, 700, and 800 do not require teeth to operate, but may operate simply via rotational friction between components where indicated herein. Alternatively, friction can be enhanced using gear teeth. It is contemplated that circular wave drives 500, 700, and 800 may alternatively operate via rotational friction between some components, and gear teeth between other components.

It is contemplated that circular wave drives 500, 700, and 800 may be used in any of a variety of actuation and/or gear reduction applications, including for example: robotic actuation, mechanical actuation, aerospace actuation, vehicle transmissions, and the like.

It is contemplated that circular wave drives 500, 700, and 800 may be used to achieve any of a variety of reduction ratios. In one embodiment, circular wave drives 500, 700, and 800 are used to create a reduction ratio of about 100:1. In another embodiment, circular wave drives 500, 700, and 800 are used to create a reduction ratio of an infinitely large ratio. In another embodiment, circular wave drives 500, 700, and 800 are used to create a reduction ratio of a lesser value, limited by the equation of 2(R2)=R1+R3, such that the lowest reduction ratio possible is that reduction ratio where 2(R2)=R1, assuming that R3 is approaching a value of 0.

FIG. 9 is a flowchart illustrating an example method 900 for determining a reduction ratio of a circular wave drive. In one embodiment, a method 900 for design of a circular wave drive is provided, the method comprising: selecting a desired reduction ratio for the circular wave drive (step 910);

providing a circular wave drive including: a wheel oriented within a housing, a wave generator oriented within the wheel in a first axial portion of the wheel, an output element oriented within the wheel in a second axial portion of the wheel, wherein the housing includes an inner wall having an inner radius R1, and wherein the output element includes an outer radius R3, wherein the circular wave drive includes friction elements not comprising gear teeth, and wherein no slippage exists between the wheel and the housing (step 920); and calculating a reduction ratio using the equation: Reduction Ratio=(R1−R3)/R3 (step 930).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A circular wave drive, comprising:
 a substantially enclosed housing having a chamber therein,
  wherein the periphery of the chamber is defined by a circular wall,
  wherein the circular wall includes an inner diameter, and
  wherein the circular wall includes a friction element;
 a ring-shaped wheel residing in the chamber,
  wherein the ring-shaped wheel includes both an external friction element and an internal friction element,
  wherein the ring-shaped wheel includes a hollow central portion including an inner wall having an inner diameter, the inner wall including the internal friction element,
  wherein the ring-shaped wheel includes an outer diameter, and
  wherein the ring-shaped wheel outer diameter is less than the inner diameter of the circular wall;
 a wave generator having a wheel-driving portion that is oriented within the hollow central portion of the ring-shaped wheel,
  wherein the wave generator includes an eccentrically mounted input shaft extending from the wheel-driving portion and through the housing; and
 an output element having a wheel-driven portion that is oriented within the hollow central portion of the ring-shaped wheel opposite the wheel-driving portion of the wave generator,
  wherein the output element includes an input shaft that extends from the wheel-driven portion and through the housing in an opposite direction of the input shaft of the wave generator, and
  wherein a peripheral face of the wheel-driven portion includes a friction element being in contact with the internal friction element of the ring-shaped wheel.

2. The circular wave drive of claim 1, wherein the inner wall of the ring-shaped wheel is axially divided into a non-friction element portion and a friction element portion.

3. The circular wave drive of claim 1, further comprising a bearing having an inner race and an outer race, wherein a peripheral surface of the wheel-driving portion of the wave generator is connected to the inner race of the bearing, and wherein the non-friction element portion of the inner wall of the ring-shaped wheel is connected to the outer race of the bearing.

4. The circular wave drive of claim 3, wherein the bearing being oriented between the wave generator and the inner wall of the ring-shaped wheel is configured to provide a sliding motion of the ring-shaped wheel along the peripheral surface of the wheel-driving portion of the wave generator during a rotation of the wave generator.

5. The circular wave drive of claim 4, wherein the sliding motion of the ring-shaped wheel causes the ring-shaped wheel to rotate with a lesser rotational speed than that of the wave generator.

6. The circular wave drive of claim 1, further comprising a bearing interposed between the input shaft of the wave generator and an opening in the housing through which the input shaft passes.

7. The circular wave drive of claim 1, further comprising a bearing interposed between the output shaft of the output element and an opening in the housing through which the output shaft passes.

8. The circular wave drive of claim 1, wherein the input shaft of the wave generator and the output shaft of the output element are coaxially aligned.

9. The circular wave drive of claim 1, wherein any of the friction elements includes at least one of: a plurality of gear teeth, a knurled surface, a raised element, an indented element, a rubber element, and a polymer element.

10. The circular wave drive of claim 1, wherein the friction elements are gear teeth, and wherein the number of teeth disposed along the circular wall of the chamber is the same as, greater than, or less than the number of external teeth on the ring-shaped wheel, and the number of the internal teeth on the ring-shaped wheel is the same as, greater than, or less than the number of the teeth on the output element so as to produce adjustable reduction in the rotational speed of the output element in comparison to the rotational speed of the wave generator.

11. A circular wave drive, comprising:
    a substantially enclosed housing having a chamber therein,
        wherein the periphery of the chamber is defined by a circular wall,
        wherein the circular wall includes an inner diameter, and
        wherein the circular wall includes a friction element;
    a ring-shaped wheel residing in the chamber,
        wherein the ring-shaped wheel includes both an external friction element and an internal friction element,
        wherein the ring-shaped wheel includes a hollow central portion including an inner wall having an inner diameter, the inner wall including the internal friction element,
        wherein the inner wall of the ring-shaped wheel is axially divided into a non-friction element portion and a friction element portion,
        wherein the ring-shaped wheel includes an outer diameter, and
        wherein the ring-shaped wheel outer diameter is less than the inner diameter of the circular wall;
    a wave generator having a wheel-driving portion that is oriented within the hollow central portion of the ring-shaped wheel,
        wherein the wave generator includes an eccentrically mounted input shaft extending from the wheel-driving portion and through the housing; and
    an output element having a wheel-driven portion that is oriented within the hollow central portion of the ring-shaped wheel opposite the wheel-driving portion of the wave generator,
        wherein the output element includes an input shaft that extends from the wheel-driven portion and through the housing in an opposite direction of the input shaft of the wave generator, and
        wherein a peripheral face of the wheel-driven portion includes a friction element being in contact with the internal friction element of the ring-shaped wheel.

12. The circular wave drive of claim 11, wherein the housing includes a main body portion and a cover element that is securable to the main body portion.

13. The circular wave drive of claim 11, further comprising a bearing interposed between the input shaft of the wave generator and an opening in the housing through which the input shaft passes.

14. The circular wave drive of claim 11, further comprising a bearing interposed between an opening in the housing and the output shaft of the output element.

15. The circular wave drive of claim 11, wherein the input shaft of the wave generator and the output shaft of the output element are coaxially aligned.

16. The circular wave drive of claim 11, further comprising a bearing having an inner race and an outer race, wherein a peripheral surface of the wheel-driving portion of the wave generator is connected to the inner race of the bearing, and wherein the non-friction element portion of the inner wall of the ring-shaped wheel is connected to the outer race of the bearing.

17. The circular wave drive of claim 11, further comprising a bearing, wherein the bearing is oriented between the wave generator and the inner wall of the ring-shaped wheel, and wherein the bearing is configured to provide a sliding motion of the ring-shaped wheel along the peripheral surface of the wheel-driving portion of the wave generator during a rotation of the wave generator.

18. The circular wave drive of claim 17, wherein the sliding motion of the ring-shaped wheel causes the ring-shaped wheel to rotate with a lesser rotational speed than that of the wave generator.

19. The circular wave drive of claim 11, wherein any of the friction elements includes at least one of: a plurality of gear teeth, a knurled surface, a raised element, an indented element, a rubber element, and a polymer element.

20. The circular wave drive of claim 11, wherein the friction elements are gear teeth, and wherein the number of teeth disposed along the circular wall of the chamber is the same as, greater than, or less than the number of external teeth on the wheel, so as to produce an adjustable reduction in the rotational speed of the output element in comparison to the rotational speed of the wave generator.

* * * * *